United States Patent [19]
Balmer et al.

[11] Patent Number: 5,392,420
[45] Date of Patent: Feb. 21, 1995

[54] IN CIRCUIT EMULATOR(ICE) THAT FLAGS EVENTS OCCURING IN SYSTEM MANAGEMENT MODE(SMM)

[75] Inventors: Mark Balmer, Tigard; Ron Whitsel, Beaverton, both of Oreg.

[73] Assignee: Intel Corporation, Santa Clara, Calif.

[21] Appl. No.: 129,683

[22] Filed: Sep. 30, 1993

[51] Int. Cl.⁶ .................. G06F 12/10; G06F 1/24; G06F 1/26
[52] U.S. Cl. .................. 395/500; 395/800; 364/260.8
[58] Field of Search .................. 395/500, 775, 800

[56] References Cited

U.S. PATENT DOCUMENTS

| | | | |
|---|---|---|---|
| 3,629,855 | 12/1971 | Conley | 395/575 |
| 4,281,380 | 7/1981 | De Mesa | 395/325 |
| 4,924,466 | 5/1990 | Gregor | 371/12 |
| 5,170,109 | 12/1992 | Yanagita | 318/568.1 |
| 5,181,204 | 1/1993 | Kasman | 371/16.5 |
| 5,249,284 | 9/1993 | Kass | 395/425 |
| 5,263,170 | 11/1993 | Kato | 395/800 |

Primary Examiner—David Y. Eng
Attorney, Agent, or Firm—Owen L. Lamb

[57] ABSTRACT

A micro processor emulator in which an SMM flag is set whenever a processor being emulated enters system management mode (SMM) mode, a diminished power mode, and is reset when the processor leaves SMM mode. Events, such as branch instructions, that are recorded in a trace memory while the processor is in SMM mode (when the SMM flag is set) are recorded as a trace frame comprised of a trace word and an associated in system management mode (IN_SMM) trace bit. When a user evokes interrogation mode of the emulator, the IN_SMM trace bit is used to calculate correct physical addresses for disassembly of the recorded trace information.

7 Claims, 3 Drawing Sheets

IN CIRCUIT EMULATOR(ICE) THAT FLAGS EVENTS OCCURING IN SYSTEM MANAGEMENT MODE(SMM)

BACKGROUND OF THE INVENTION

1. Field of the Invention

The present invention is related to data processing systems and more specifically, to an in-circuit emulator for qualifying events based upon whether or not a processor was in or out of a particular processor mode at the time of recordation of the event.

2. Prior Art

The Intel 386SL is a microprocessor that is used in notebook computers. A notebook computer is a small, lightweight, portable, battery-powered, lap-top personal computer (PC) that uses a thin, lightweight, display screen such as a liquid crystal display (LCD). Notebook PCs typically run several hours on rechargeable batteries, weigh 4–7 pounds, fold up, and can be carried like a briefcase. In order to conserve power and prolong battery energy, the 386SL has a feature known as system management mode (SMM) wherein power to devices, such as disk drives, is shut down for periods of time when they are not in use. When the 386SL is operating in SMM mode, user code is executed from a different physical address space than the address space from which normal code is executed.

An in-circuit emulator (ICE) duplicates and imitates the behavior of a chip it emulates by using programming techniques and special machine features to permit the ICE to execute micro code written for the chip that it imitates.

An emulation processor operates in two execution modes, emulation mode and interrogation mode. Emulation mode is the mode of the emulator which includes real-time event evaluation. Interrogation mode is an interrupt service environment of the emulator. A monitor (ICE code) that is emulation of processor code executed during interrogation mode is provided. A break occurs to exit emulation mode to enter interrogation mode and thus invoke the monitor.

Before user code (instructions written in a particular language) can be decoded by a micro processor, the user code must be translated by an assembler into a series of operation codes (op codes) that the micro processor can understand. An op code is a numeric value, decoded by the micro processor, that instructs the micro processor to perform a specific operation. Emulation software attempts to disassemble op codes to reconstruct the original user code.

Since code executed in SMM mode maps to a different address space, if a user wants to examine that code via the emulator interrogation mode facility, the SMM address space must be opened up, examined and then closed. During emulation mode, trace information is collected in a trace buffer. The trace information does not include every line of code, but to save space only records boundary conditions such as branch instructions. In interrogation mode the boundary condition instructions in the trace buffer are used to reconstruct the original code by generating addresses to user memory. Since the events recorded while in SMM mode refer to a different address space than events recorded in normal mode, the calculated addresses for SMM events will not be correct. In the past the emulation software assumed that any invalid op codes that were found were op codes corresponding to SMM events. The software then tired to reconstruct the user code generated while in SMM mode by invoking special code sequences. This prior technique is not always successful and involves a high overhead penalty.

It is therefore an object of the present invention to provide a method and apparatus for determining what mode a processor is in at the time of event recordation in a trace memory so that a correct address to physical memory is calculated when trace memory is processed to ensure that the events recorded disassemble the correct address space.

SUMMARY OF THE INVENTION

Briefly, the above object is accomplished in accordance with the invention by providing an SMM flag latch which is set whenever a processor being emulated enters system management mode (SMM) mode and is reset when the processor leaves SMM mode. Events, such as branch instructions, that are recorded in trace memory while the processor is in SMM mode (when the SMM flag is set) are recorded as a trace frame comprised of a trace word and an associated IN_SMM trace bit. When a user evokes interrogation mode, the IN_SMM trace bit is used to calculate correct physical addresses for disassembly of the trace information.

The invention has the advantage that a mechanism ensures that all frames are marked as written so that entry and exit events will not be lost by falling off of the end of the trace buffer.

The invention has the further advantage that by adding the SMM flag to event recognition qualification it is possible to specify that a break event occurred while in or not in system management mode.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
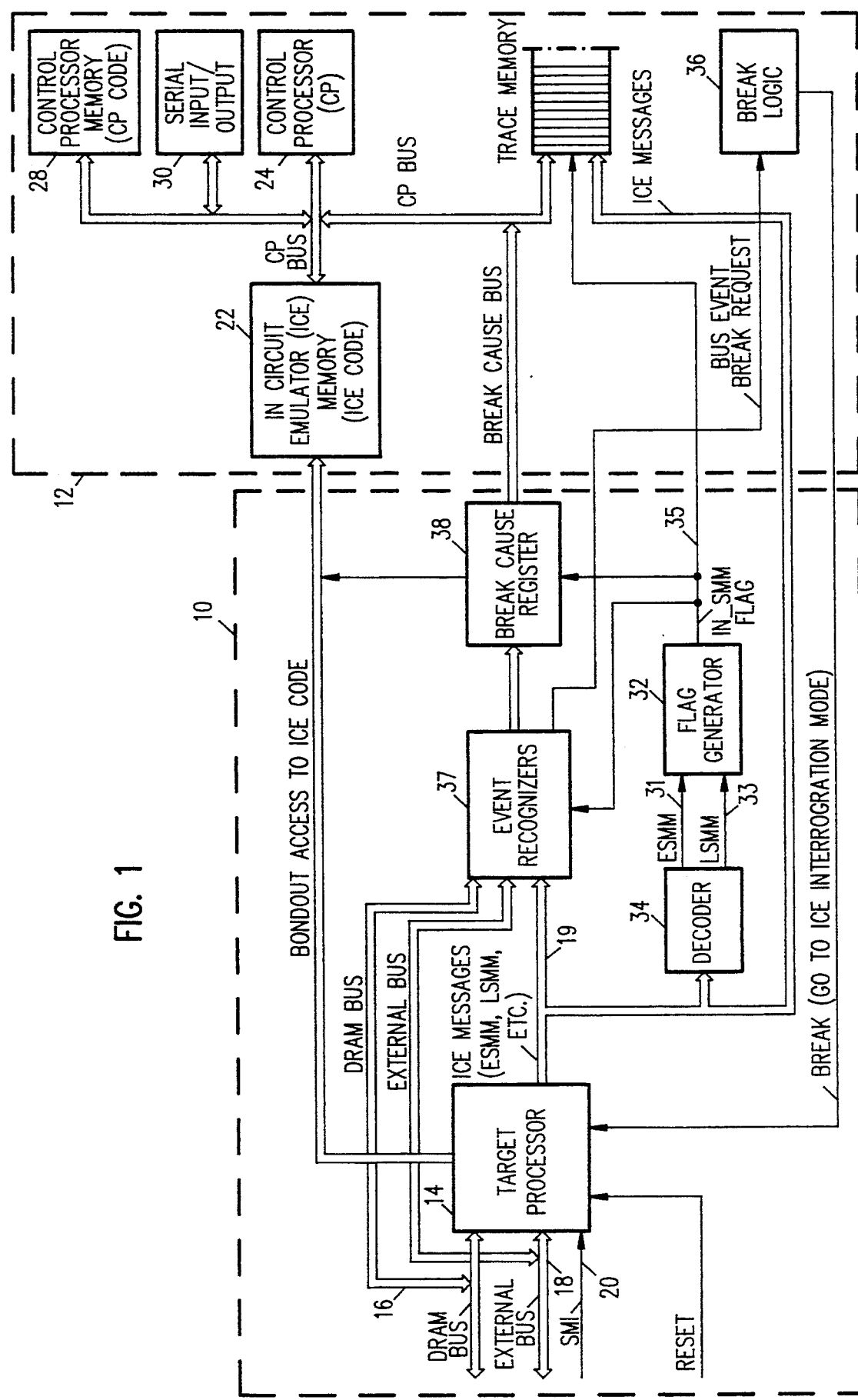
FIG. 1 is a block diagram of a microprocessor emulator in which the present invention is embodied.

A probe (10) is linked to an in circuit emulator (ICE) base (12) via a user cable. On the probe is a target processor (14). The target processor (14) interfaces with a dynamic random access memory (DRAM) bus (16), an external bus (18), and system management interrupt (SMI) bus (20).

On the ICE base (12) is a control processor (CP-22) that interfaces with control processor (CP) code (28), serial input/output (SIO-30), and ICE memory (22). The control processor (24) executes CP code out of control processor memory (28). The target processor (14) executes ICE code out of ICE memory (22) when in ICE mode. Event recognizers (37) recognize events that occur on the inputs which are the DRAM bus (16), the external bus (18) and the ICE messages bus (19). Break logic (36) is provided to perform a break function in response to a bus event break request from the event recognizers (37). The break logic (36) generates a break signal to the target processor (14) that causes the target processor to go from emulation mode to interrogation mode.

A trace memory (40) is provided on the ICE base (12) which holds trace frames created during interrogation mode. The trace memory is shown in more detail in FIG. 3.

The target processor (14) has a core processor that includes ICE hooks logic that facilitates in-circuit or real-time debugging. The ICE hooks logic generates ICE messages including two messages Enter System Management Mode (ESMM) and Leave System Management Mode (LSMM). The ICE messages are sent to trace memory (40). The trace memory stores trace word frames. Each frame records events occurring on the trace bus, such as branch instructions, records ICE messages and records other control information.

The probe (10) includes an event recognizer (37) that issues a bus event break request to break logic (36) on the ICE base (12). The break logic (36) issues the signal Break Go to ICE Mode to the target processor (14) which stops the execution of micro code in emulation mode and goes to interrogation mode. A decoder (34) recognizes an ESMM message when it occurs and sets a flag generator (32). The signal IN_SMM FLAG is output from the flag generator (32). The flag generator (32) is reset when an LSSM message is recognized.

The output of the flag generator (32) is connected to the trace memory (40) which stores the state of the IN_SMM FLAG in a trace word frame along with the ICE message and trace bus information. This marks the frames of the processor as either "bus trace" or "execution trace" using a bit (trace bit for IN_SMM) which indicates whether the processor was in or out of SMM when the frame was recorded.

The output of the flag generator (32) is also connected to a break cause register (38) which identifies the initiators of a break to exit emulation and enter interrogation. The cause register is valid during interrogation mode and cleared upon entering emulation mode.

The output of the flag generator (32) is also connected to the event recognizers (37) wherein IN_SMM flag is used to further qualify the bus events based upon whether or not an event occurred when in or out of SMM mode.

SMM entry and exit messages are transmitted by the processor at the time events occur. When the processor is reset or a leave SMM (LSMM) message is received, the IN_SMM flag is cleared. When an enter SMM (ESMM) message is received, the IN_SMM flag is set. The status of the SMM flag is written into each trace frame. The IN_SMM flag is readable by both the target processor and the emulator base/host.

Flag Generator

Figure 2:
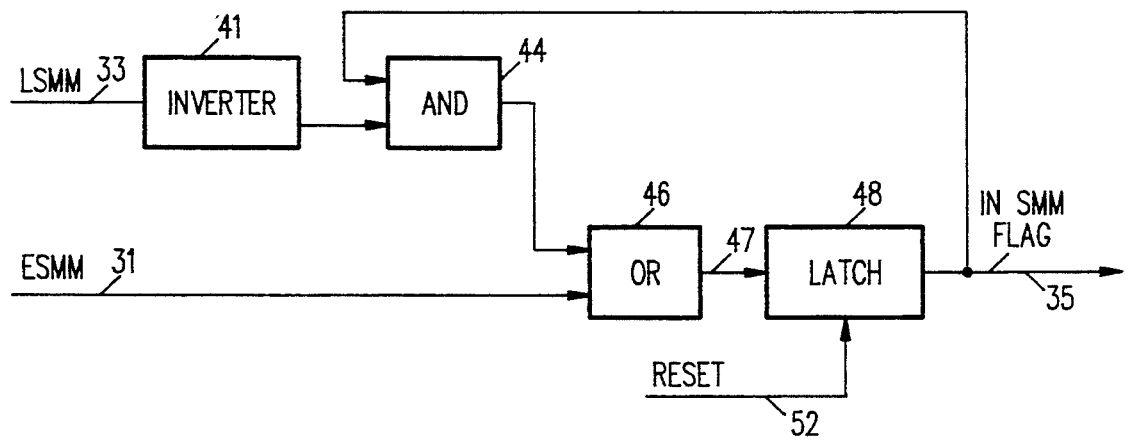
FIG. 2 is a block diagram of the flag generator shown in FIG. 1.

The flag generator (32) is shown in more detail in FIG. 2. When an enter SMM (ESMM) message is received, the ESMM signal (31) is asserted, causing an output (47) of OR circuit (46) to turn on a latch (48). The output (50) of the latch is the IN_SMM flag. The output (50) of the latch is brought back to one input of an AND (44). Since the leave SMM (LSMM) signal (33) is inverted by an inverter (41), the other input to AND (44) is also asserted. Since both inputs to the AND (44) are asserted, the output of the AND, which is connected to OR (46), keeps the input (47) to the latch asserted to thereby keep the latch latched.

When a leave SMM (LSMM) message is received, the LSMM signal (33) is asserted, causing the output of the inverter (41) to fall which causes the output of AND (44) to fall and also the output of OR (46) to fall which unlatches the input to latch (48), to thereby clear the IN_SMM flag. When the processor is reset (52) the latch (48) is turned off and the IN_SMM flag is cleared.

Trace Memory

Figure 3:
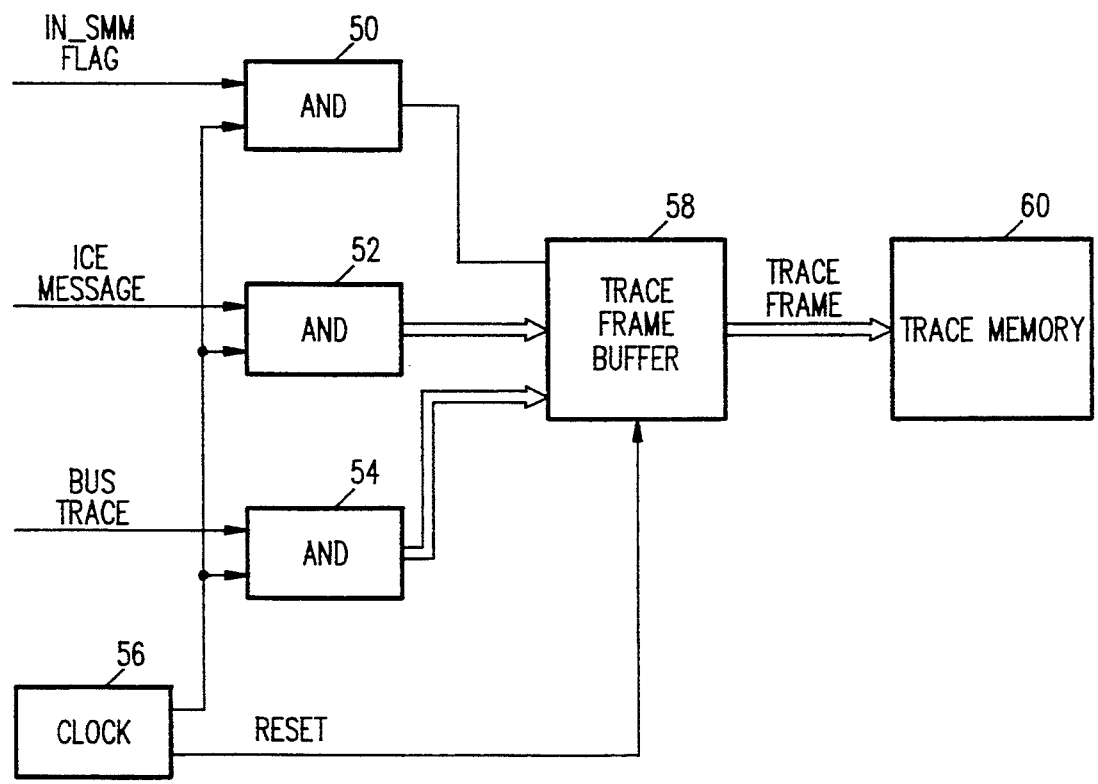
FIG. 3 is a block diagram of the trace memory shown in FIG. 1.

The trace memory (40) is shown in FIG. 3. The IN_SMM flag (35) from flag generator (32), ICE messages from the target processor (14) and bus trace information from the ICE bus are gated through AND circuits (50, 52, 54) by a clock signal from a clock (56). The outputs of the AND circuits become a trace frame and are stored temporarily in a trace frame buffer (58). The clock (56) includes a reset signal line connected to the trace frame buffer (58) for setting the bits including the SMM bit in said trace frame to a 0 state. From the trace frame buffer, a trace frame is transferred to the trace memory (60) where it is stored along with other trace frames. The trace frames in the memory (60) comprise a record or trail of events that is used to reconstruct the code that caused the events.

Flow Diagram

Figure 4:
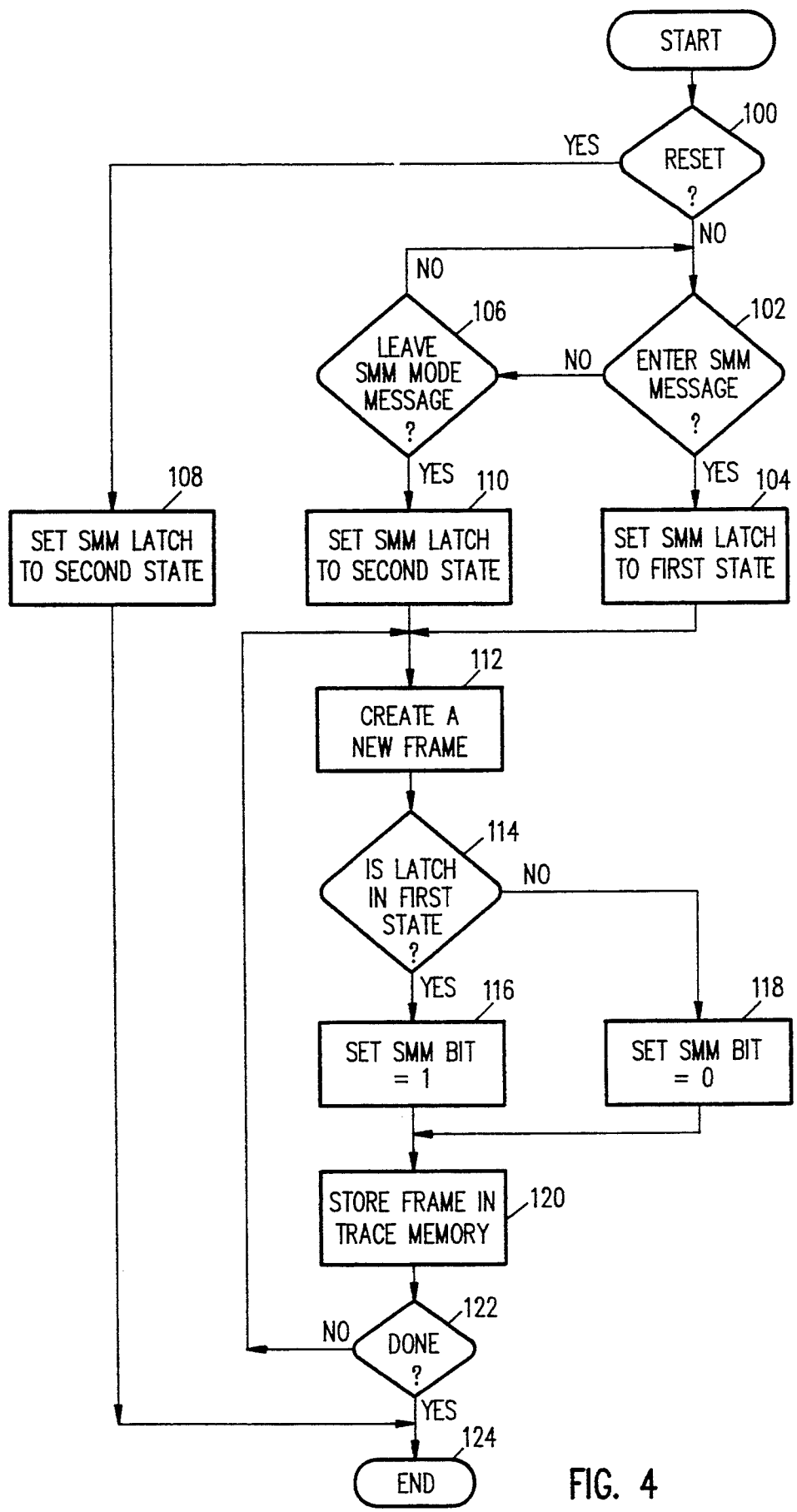
FIG. 4 is a flow diagram of the operation of the logic shown in FIG. 1.

Refer to FIG. 4 which is a flow diagram of the operation of the logic shown in FIG. 1. If a reset (100) does not occur, and if an enter SMM mode message is received (102), the SMM latch is set to a first state (104). If a leave SMM mode message is received (106) the SMM latch is set to a second state (110).

A trace frame is created (112), the trace frame including an SMM bit. The SMM latch is read (114) to determine if the SMM latch is in the first state or in the second state. The SMM bit in the trace frame is set to 1 (116) upon a condition that the SMM latch is in the first state. The SMM bit in the trace frame is set to 0 (118) upon a condition that the SMM latch is in the second state. The frame, including the IN_SMM bit, is stored in trace memory (120). If the operation is not done (122), then the flow loops back to create a new frame (112). If not, the flow ends (124). If a reset (100) occurs the SMM latch is set to a second state (108) and the flow ends.

While the invention has been particularly shown and described with reference to preferred embodiments thereof, it will be understood by those skilled in the art that the foregoing and other changes in form and detail may be made therein without departing from the scope of the invention.

What is claimed is:

1. A micro processor emulator operable in conjunction with a target processor, said target processor including means for transmitting to said emulator an enter SMM mode message and a leave SMM mode message, said micro processor emulator comprising:

first means for latching a first state and a second state;

second means connected to said first means and to said target processor for setting said first means to said first state upon a first condition that said enter SMM mode message is received at said second means;

third means connected to said first means and to said target processor for setting said first means to said second state upon a second condition that said leave SMM mode message is received at said third means;

fourth means for creating a trace frame, said trace frame including an SMM bit;

fifth means connected to said first means for determining if said first means is in said first state or in said second state; and, sixth means connected to said fourth and fifth means for setting said SMM bit in said trace frame to a first state (bus trace) upon a third condition that said SMM latch is in said first state.

2. The micro processor emulator of claim 1 wherein said sixth means further comprises seventh means for setting said SMM bit in said trace frame to a second state (execution trace) upon a fourth condition that said SMM latch is in said second state.

3. A micro processor emulator operable in conjunction with a target processor, said target processor including means for transmitting to said emulator an enter SMM mode message and a leave SMM mode message, said micro processor emulator comprising:

a latch for latching a first state and a second state;

an OR circuit connected to said latch and to said target processor for setting said latch to said first state upon a first condition that said enter SMM mode message is received at said OR circuit;

a first AND circuit connected to said OR circuit and to said target processor for setting said latch to said second state upon a second condition that said leave SMM mode message is received at said AND circuit;

a trace frame buffer for buffering a trace frame, said trace frame including an SMM bit;

a second AND circuit connected to said latch and to said trace frame buffer for determining if said latch is in said first state or in said second state; and, a clock connected to said second AND circuit for setting said SMM bit in said trace frame buffer to a first state (bus trace) upon a third condition that said SMM latch is in said first state.

4. The micro processor emulator of claim 3 wherein said clock includes a reset signal line connected to said trace frame buffer for setting said SMM bit in said trace frame to a second state (execution trace).

5. The micro processor emulator of claim 3 further comprising: means for setting said SMM bit in said trace frame to a second state (execution trace) upon a fourth condition that said SMM latch is in said second state.

6. In a micro processor emulator operable in an interrogation mode and an emulation mode, a method comprising the steps of:

A. providing a system management mode (SMM) latch that is capable of being set by said target processor and read by said emulator;

B. setting said SMM latch to a first state upon a first condition that said enter SMM mode message is received;

C. setting said SMM latch to a second state upon a second condition that said leave SMM mode message is received;

D. creating a trace frame, said trace frame including an SMM bit;

E. reading said SMM latch to determine if said SMM latch is in said first state or in said second state; and;

E. setting said SMM bit in said trace frame to a first state (bus trace) upon a third condition that said SMM latch is in said first state.

7. The method in accordance with claim 6 further comprising the step of:

F. setting said SMM bit in said trace frame to a second state (execution trace) upon a fourth condition that said SMM latch is in said second state.

* * * * *